(12) United States Patent
Sousa et al.

(10) Patent No.: US 11,474,817 B2
(45) Date of Patent: Oct. 18, 2022

(54) PROVENANCE-BASED REUSE OF SOFTWARE CODE

(71) Applicant: EMC IP Holding Company LLC, Hopkinton, MA (US)

(72) Inventors: Vitor Sousa, Niterói (BR); Jonas F. Dias, Rio de Janeiro (BR); Adriana Bechara Prado, Niterói (BR)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 16/401,635

(22) Filed: May 2, 2019

(65) Prior Publication Data

US 2020/0348929 A1   Nov. 5, 2020

(51) Int. Cl.
  *G06F 8/36* (2018.01)
  *G06F 8/73* (2018.01)
  *G06F 8/75* (2018.01)

(52) U.S. Cl.
  CPC ........... *G06F 8/751* (2013.01); *G06F 8/36* (2013.01); *G06F 8/73* (2013.01)

(58) Field of Classification Search
  USPC ........................................................ 717/120
  See application file for complete search history.

(56) References Cited

U.S. PATENT DOCUMENTS

| | | | | | |
|---|---|---|---|---|---|
| 8,209,204 | B2* | 6/2012 | Adler | ............ | G06Q 10/06 705/7.11 |
| 8,572,560 | B2* | 10/2013 | Drissi | ............ | G06F 8/71 717/120 |
| 10,114,624 | B1* | 10/2018 | Makkar | ............ | G06F 8/36 |
| 10,452,367 | B2* | 10/2019 | Allamanis | ............ | G06F 11/3604 |
| 2007/0168946 | A1* | 7/2007 | Drissi | ............ | G06F 8/36 717/110 |
| 2007/0261042 | A1* | 11/2007 | Chen | ............ | G06F 8/4442 717/148 |

(Continued)

OTHER PUBLICATIONS

Miyani et al, "BinPro: A Tool for Binary Source Code Provenance", [Online], pp. 1-11, [retrieved from internet on May 18, 2022], < https://arxiv.org/pdf/1711.00830.pdf> (Year: 2017).*

(Continued)

*Primary Examiner* — Ziaul A Chowdhury
*Assistant Examiner* — Zengpu Wei
(74) *Attorney, Agent, or Firm* — Ryan, Mason & Lewis, LLP

(57) ABSTRACT

Techniques are provided for provenance-based software script reuse. One method comprises extracting provenance data from source code including, for example, source code fragments, wherein the extracted provenance data indicates a control flow and a data flow of the source code; encapsulating source code fragments from the source code that satisfy one or more similarity criteria as a reusable source code fragment; and providing a repository of encapsulated reusable source code fragments for reuse during a development of new software scripts. The repository of encapsulated reusable source code fragments optionally comprises a searchable database further including, for example, the provenance data, data annotations, input parameters and generated results for the corresponding source code fragment.

20 Claims, 10 Drawing Sheets

(56) References Cited

U.S. PATENT DOCUMENTS

| | | | | |
|---|---|---|---|---|
| 2009/0013308 | A1* | 1/2009 | Renner | G06F 8/34 |
| | | | | 717/109 |
| 2010/0114630 | A1* | 5/2010 | Adler | G06Q 10/06 |
| | | | | 705/7.36 |
| 2014/0331202 | A1* | 11/2014 | Fukuda | G06F 8/751 |
| | | | | 717/123 |
| 2018/0336019 | A1* | 11/2018 | Schmidt | G06F 16/248 |
| 2019/0005117 | A1* | 1/2019 | Vasisht | G06F 8/70 |
| 2019/0138495 | A1* | 5/2019 | Miyamoto | G06F 15/825 |
| 2019/0205125 | A1* | 7/2019 | van Schaik | G06F 8/77 |
| 2019/0243622 | A1* | 8/2019 | Allamanis | G06F 8/33 |
| 2020/0019389 | A1* | 1/2020 | Durvasula | G06F 8/36 |
| 2020/0183668 | A1* | 6/2020 | Krishnamoorthy | G06K 9/6218 |

OTHER PUBLICATIONS

Koop et al., "VisComplete: Automating Suggestions for Visualization Pipelines," em IEEE Transactions on Visualization and Computer Graphics, Piscataway, NJ, USA, 2008.
Freire et al., "Provenance for Computational Tasks: A Survey," em Computing in Science and Engineering Journal, Piscataway, NJ, USA, 2008.
C. W. Krueger, "Software Reuse," ACM Computing Surveys (CSUR), vol. 24, n° 2, pp. 131-183, 1992.
U.S. Appl. No. 16/039,743 entitled "Allocation of Shared Computing Resources Using Source Code Feature Extraction and Clustering-Based Training of Machine Learning Models," filed Jul. 19, 2018.

\* cited by examiner

PROVENANCE-BASED REUSE OF SOFTWARE CODE

FIELD

The field relates generally to software development.

BACKGROUND

Companies from different business segments often have a software team comprised of software developers, analysts, data engineers and data scientists (hereinafter, collectively referred to as script developers). The script developers may develop software scripts, for example, that access, transform, and/or analyze the content of datasets that are often spread across several work locations. In addition, the software team routinely adapts software scripts over time to address new requirements or analyses requested by decision makers. Some of these requirements may motivate minor adjustments to a given software script, while other requirements may demand more substantial modifications of the original source code. The latter case usually encourages the registration of this modified source code as a new script.

A need exists for techniques for reusing software code, or portions thereof.

SUMMARY

In one embodiment, a method comprises extracting provenance data from source code comprising a plurality of source code fragments, wherein the extracted provenance data indicates a control flow and a data flow of the source code; encapsulating two or more source code fragments from the source code that satisfy one or more similarity criteria as a reusable source code fragment; and providing a repository of a plurality of the encapsulated reusable source code fragments for reuse during a development of new software scripts.

In some embodiments, the step of encapsulating the two or more source code fragments from the source code that satisfy one or more similarity criteria as the encapsulated reusable source code fragment further comprises the steps of: performing a pairwise comparison of pairs of the source code fragments to identify similar source code fragments; and/or clustering similar lines of software code from multiple source code scripts to encapsulate them as the encapsulated reusable source code fragments.

In at least one embodiment, the repository of encapsulated reusable source code fragments comprises a searchable database further comprising the provenance data, data annotations, input parameters and generated results for the corresponding source code fragment.

Other illustrative embodiments include, without limitation, apparatus, systems, methods and computer program products comprising processor-readable storage media.

DETAILED DESCRIPTION

Figure 1:
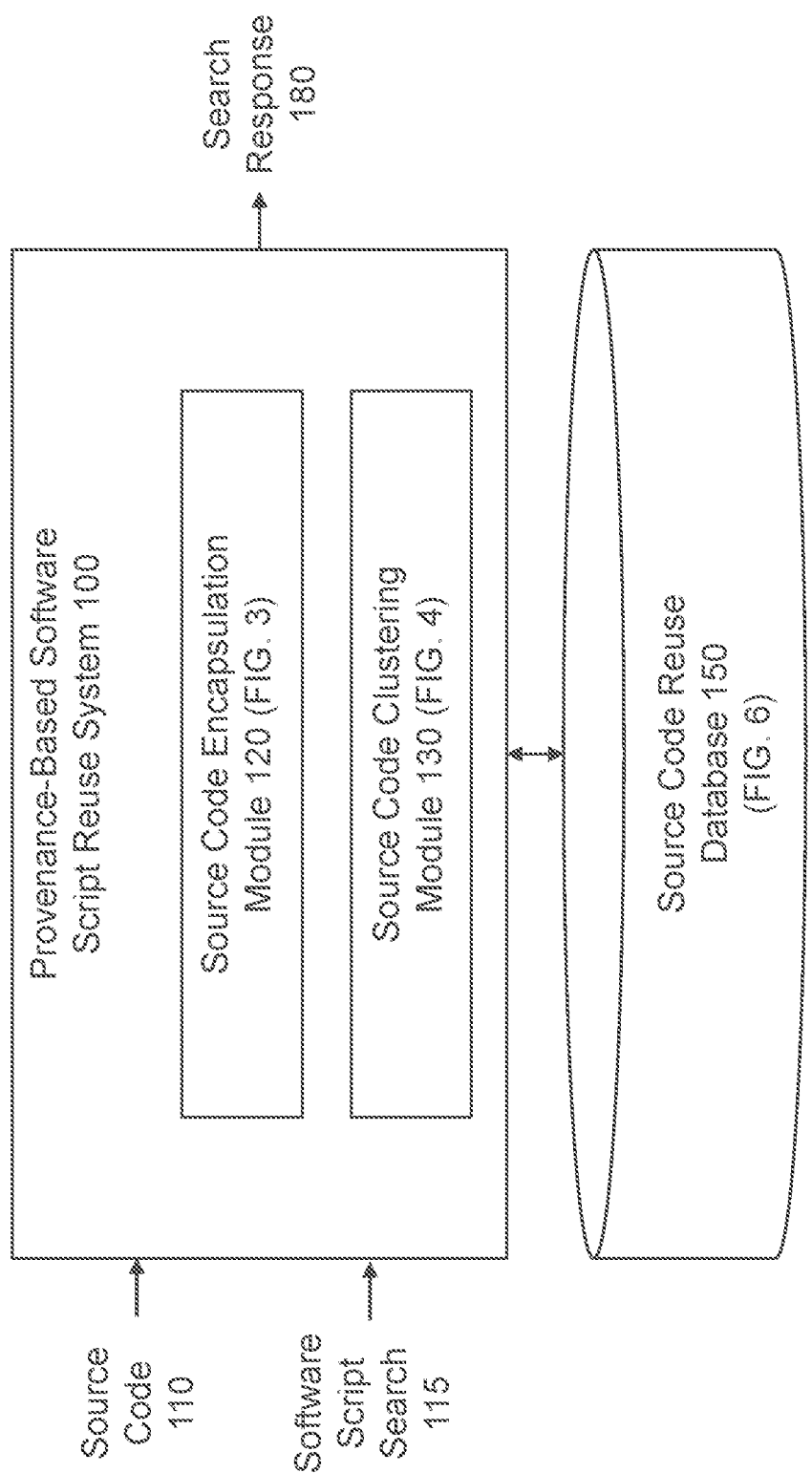
FIG. 1 illustrates a provenance-based software script reuse system, according to some embodiments of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for provenance-based software script reuse.

Data scientists typically perform data analysis using software scripts to investigate specific application behaviors or obtained results. In addition, data scientists often separately create scripts for each domain application, which can be time consuming and error prone. One or more aspects of the present disclosure recognize that these software scripts usually present similar lines of software code that can be encapsulated as reusable fragments. Therefore, data scientists could use these fragments during the development of new scripts.

In one or more embodiments, provenance-based techniques are provided for managing: (i) provenance graphs (e.g., control flow from scripts), (ii) identified reusable code fragments, and (iii) related assets (e.g., input parameters and results) generated by the execution of scripts. In some embodiments, a method is provided for clustering similar lines of software code from multiple scripts and encapsulating them as reusable fragments.

Tracking data and metadata related to the development of data science software scripts adds valuable information for data scientists. Such valuable information also incorporates semantic data that facilitates query processing over time, not limited to the structure of the software code. For instance, a data scientist may need to investigate knowledge acquired from the development of particular software scripts in order to facilitate the programming of new software scripts with similar goals. This practical example is intrinsically associated with the benefits of minimizing the code development efforts and, consequently, saving time. Meanwhile, decision makers may also request an examination of the data science analyses in order to investigate if they are in compliance with the strategic goals and recommendations of the company. In other situations, decision makers may want to compare results from two software scripts having similar purposes, e.g., with multiple similar lines of software code.

Some embodiments of the disclosure facilitate the reuse of software scripts, using provenance data. Although the disclosed provenance-based techniques for reusing software scripts function for any set of software scripts, the exemplary case of software scripts developed by data scientists (e.g., data science software scripts) is used to illustrate the exemplary embodiments. Provenance data management is often found in workflow systems, which typically use the provenance data for the reproducibility of scientific experiments and the tracking of scientific results.

While some workflow systems support software reuse, they do not address other daily necessities of data scientists, which typically work with scripts and interactive notebooks using programming languages, such as the Python programming language and the R programming language for statistical computing and graphics. See, for example, D. Koop et al., "VisComplete: Automating Suggestions for Visualization Pipelines," *IEEE Transactions on Visualization and Computer Graphics*, Piscataway, N.J., USA, 2008, incorporated by reference herein in its entirety.

For example, data science platforms are designed to support the necessities of data scientists, but they usually do not track data transformations in software scripts or foster software script reuse based on the identified similar lines of software code. In some embodiments, the information available in the provenance of a source code repository is used to identify similar fragments of software scripts and interactive notebooks.

In at least one embodiment, an exemplary provenance-based method for reusing software scripts comprises three steps, corresponding to the (i) capture of prospective provenance graphs from software scripts, (ii) encapsulation and reuse of similar lines of software code as code fragments, and (iii) management of assets manipulated during the execution of data analysis software scripts, as discussed further below.

Developers routinely program software scripts containing similar computational processing steps. In this circumstance, the developers spend additional time programming similar or even the same lines of source code. Moreover, redundant software scripts impact the readability and conciseness of the source code fragments in a negative way. Thus, one or more aspects of the disclosure recognize that the management of these similar lines of code could speed up the development of new scripts.

Software scripts developed by data scientists are often executed to perform specific tasks. These software scripts can be considered "black boxes," since only input and output datasets are typically considered for these tasks. Inside each software script, there may be a chain of smaller computational procedures (e.g., a workflow), where one or more steps (e.g., lines of source code) may correspond to a specific goal or functionality. Since the information regarding implicit workflows of previous analyses may not be available for data scientists, it is harder for the data scientists to understand the purpose of the software scripts and how they were originally programmed, including their main procedures.

In one or more embodiments, the code structure of every software script is managed and information is maintained regarding how the software scripts were modified and used over time. Thus, data scientists can interpret their content with additional context. Consequently, the data scientists can be more comfortable in reusing software scripts or their internal procedures.

Considering the development environment for software scripts, developers typically create several software scripts with similar source codes in different workspaces. Thus, it is often difficult to manually find relevant pieces of previous analyses when developing new scripts, since it requires searching for specific software scripts, to access their contents, and to filter lines of source code that address the same target functionality. Since these steps are typically manually executed by developers, they consequently become error-prone and time-consuming.

Provenance is an important subject associated with the origins and the history of data. See, for example, J. Freire et al., "Provenance for Computational Tasks: A Survey," in *Computing in Science and Engineering Journal*, Piscataway, N.J., USA, 2008, incorporated by reference herein in its entirety. Provenance data management is often divided into two categories: prospective and retrospective. Prospective provenance manages information about the structure of computational processing steps from an application. Thus, when the data science analysis scenario is considered, it represents the control flows imposed by the source code of scripts. Conversely, retrospective provenance manages data and metadata associated with the execution of software scripts, such as input and output data elements from datasets, and performance data. Therefore, this kind of provenance tracks the data flows generated by scripts.

Furthermore, the capture of provenance data and the storage of provenance data are important tasks, since it is not trivial to define which data should be monitored and how to represent all of the information in a standard model. Existing solutions often do not compare code structures from different software scripts to identify reusable components automatically. Concurrently, the World Wide Web Consortium (W3C) proposes a provenance (PROV) family of specifications for generic provenance data models (DM), named PROV-DM. This contribution of PROV-DM may enable the definition of a conceptual data model for the disclosed provenance-aware approach to provide collaboration, process visualization, traceability, reproducibility, and reliability of developed scripts. More specifically, this PROV-compliant data model contributes to represent scripts, their reusable fragments, and user interactions in the present disclosure.

Another important research topic in the present context is source code reuse, which is a well-studied topic in software engineering research. See, for example, C. W. Krueger, "Software Reuse," *ACM Computing Surveys (CSUR)*, Vol. 24, No. 2, pp. 131-183, 1992, incorporated by reference herein in its entirety. Source code reuse leverages the use of previously defined assets (or products) of the software development life cycle, which include, for example, source codes, software components, designs, and documentation. Moreover, source code reuse is often organized in five dimensions according to its purpose. Software (or, in the present context, data analysis software scripts) built for reuse commonly comprise two dimensions: abstraction and classification. The abstraction dimension intends to identify units of reusable knowledge (or code fragments) and to represent them in an abstract and concise form. The classification dimension stores reusable fragments into a database that can be indexed and classified. Meanwhile, data science software scripts built with reuse comprise the remaining dimensions: selection, specialization, and integration. The selection dimension queries reusable code fragments. Then, the specialization dimension performs modifications on these fragments to meet new system requirements. Finally, the integration dimension provides the injection of reusable code fragments in new scripts.

Provenance-Based Techniques for Reusing Software Scripts

In one or more embodiments, a provenance-aware method, system and computer program product are provided for identifying similar source code excerpts from multiple software scripts, to encapsulate these source code excerpts as fragments, and to reuse these encapsulated source code fragments during the development of new scripts. In some embodiments, a searchable database is provided to store the provenance graphs from software scripts, the data annotations of the software scripts, the encapsulated reusable source code fragments, and the manipulated assets.

FIG. 1 illustrates a provenance-based software script reuse system 100, according to some embodiments of the disclosure. Various aspects are discussed in further detail below in conjunction with FIGS. 2 and 5. As shown in FIG. 1, the exemplary provenance-based software script reuse system 100 processes source code 110 and software script searches 115 and comprises a source code encapsulation module 120, as discussed further below in conjunction with FIG. 3, that encapsulates similar pieces of source code as reusable code fragments, that can be provided as a search response 180 to software script searches 115.

As shown in FIG. 1, the exemplary provenance-based software script reuse system 100 further comprises a source code clustering module 130, as discussed further below in conjunction with FIGS. 4A and 4B, that clusters similar pieces of source code from multiple scripts.

Figure 6:
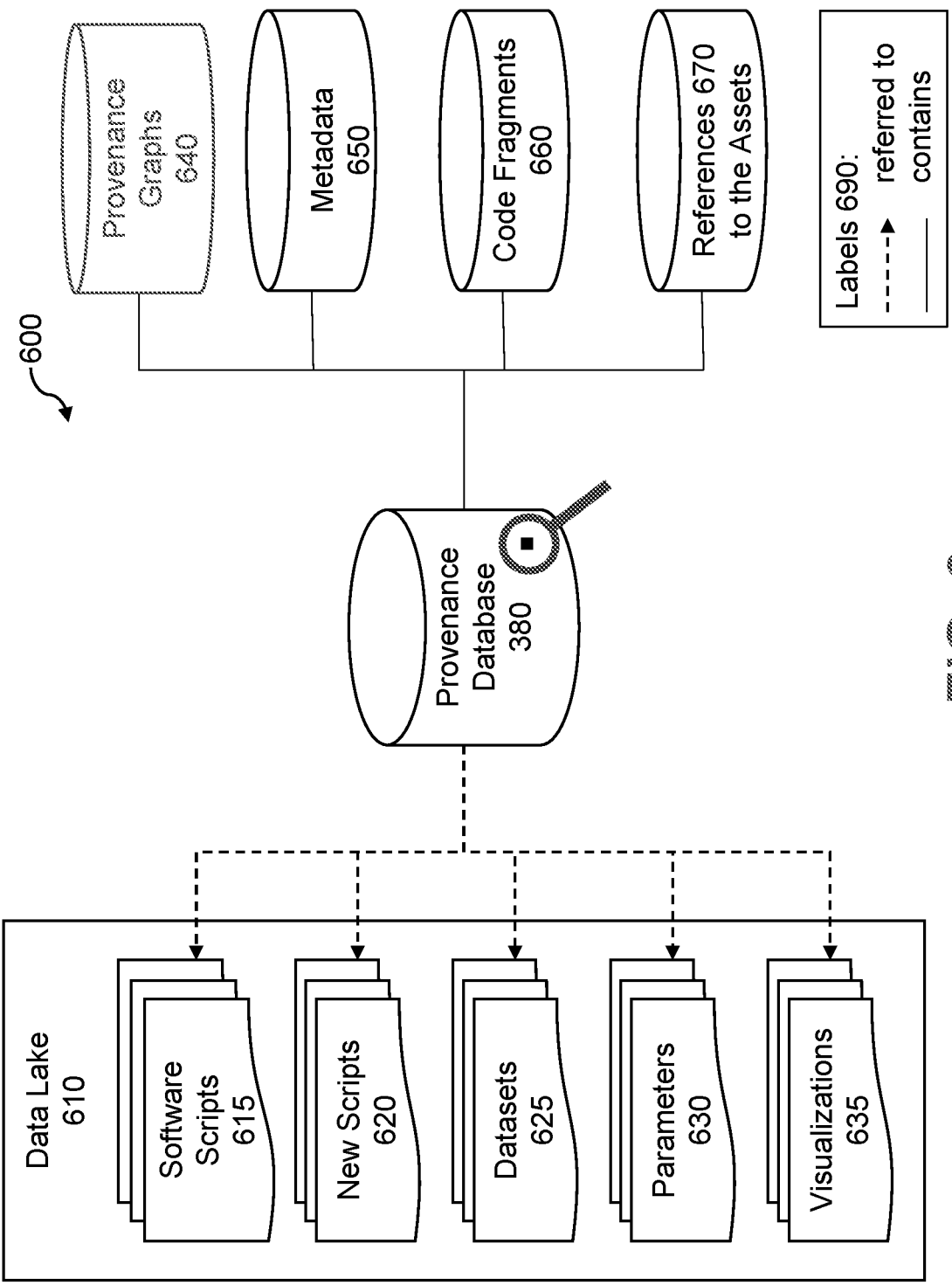
FIG. 6 illustrates an exemplary implementation of the exemplary searchable source code reuse database of FIG. 1 in further detail, according to some embodiments.

As noted above, in some embodiments, a searchable source code reuse database 150, as discussed further below in conjunction with FIG. 6, is provided to store the provenance graphs from software scripts, the data annotations of the software scripts, the encapsulated reusable source code fragments, and the manipulated assets. Generally, the exemplary source code reuse database 150 combines asset references with provenance data and reusable code fragments.

Figure 2:
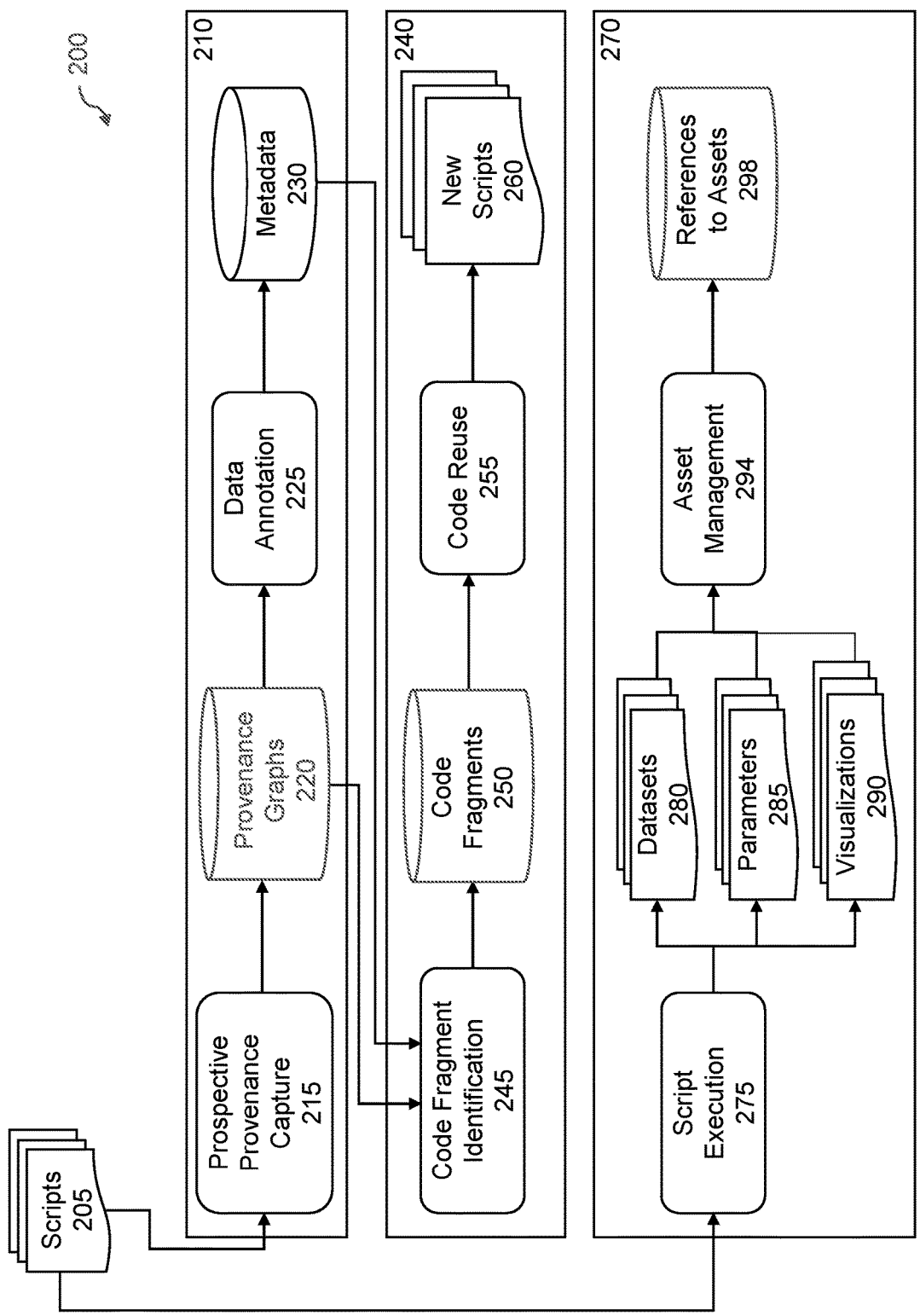
FIG. 2 is a flow chart illustrating an exemplary implementation of a provenance-based process for reusing software scripts, according to one embodiment of the disclosure.

FIG. 2 is a flow chart illustrating an exemplary implementation of a provenance-based process 200 for reusing software scripts, according to one embodiment of the disclosure. As shown in FIG. 2, the exemplary provenance-based process 200 for reusing software scripts comprises three steps, namely, a data and metadata capture step 210, a fragment reuse step 240, and an asset management step 270, each detailed further below. Generally, the data and metadata capture step 210 and the fragment reuse step 240 involve the data and metadata management related to the structures of software scripts. The exemplary asset management step 270 involves the management of assets consumed and produced during the execution of software scripts.

As shown in FIG. 2, during the exemplary data and metadata capture step 210, one or more software scripts 205 are applied to a prospective provenance capture step 215 that identifies prospective provenance graphs 220 from the software scripts 205, and data annotations added by the software script developer are registered by a data annotation step 225. The prospective provenance capture step 215 may extract an Abstract Syntax Tree or a Control Flow Graph from the software scripts 205, since the software scripts 205 contain valuable information about the code structures and the sequential order of procedures to be run. The data annotation step 225 describes the importance of annotating data on developed software scripts 205, such as manual user-defined labels, source code comments, and creation and modification timestamps. When this type of information is stored in a single metadata data storage, such as a provenance database, it enables data scientists to query developed software scripts and their metadata, and to combine these data with interactions of users (e.g., fine code adjustments or substantial modifications on the code structure), as described in, for example, J. Freire et al., "Provenance for Computational Tasks: A Survey," referenced above.

As shown in FIG. 2, during the fragment reuse step 240 software script reuse first requires an identification of code fragments in the software scripts 205 during step 245, using the prospective provenance graphs 220 and metadata 230, to identify source code fragments 250 from the software scripts 205 so that the source code fragments 250 can be used reused during step 255 for the development of new software scripts 260.

In this context, there are several algorithms and methods that can provide for pairwise comparison of the prospective provenance graphs 220 extracted from the software scripts 205 to identify similar pieces of source code for reuse, as discussed further below in conjunction with FIGS. 3, 4A and 4B.

As noted above, the exemplary asset management step 270 involves the management of assets consumed and produced during the execution of software scripts. For instance, these assets can be represented by input datasets, input parameters, service level agreements (SLAs), results and visualizations spread in several workspaces. Due to the large number and variety of assets manipulated by software scripts, data loading and data representation are important concerns in this scenario.

As shown in FIG. 2, during the exemplary asset management step 270, the one or more software scripts 205 are applied to a script execution step 275 that executes the software scripts 205 and generates one or more of datasets 280, parameters 285 and visualizations 290 that are stored in a database 298, as discussed further below in conjunction with FIG. 6, with references to the various assets 280, 285, 290, during an asset management step 294.

With respect to the representation of the data in the database 298, one or more embodiments of the disclosure, as discussed further below in conjunction with FIG. 6, employ a standard conceptual data model to represent all assets database 298 regarding software scripts 205 with different goals and applicability domains. Generally, with a database 298 that follows the data model of FIG. 6, software script developers can query assets in this database 298, and analyze input parameters 285 and the respective results obtained from the execution of their software scripts 205.

Figure 3:
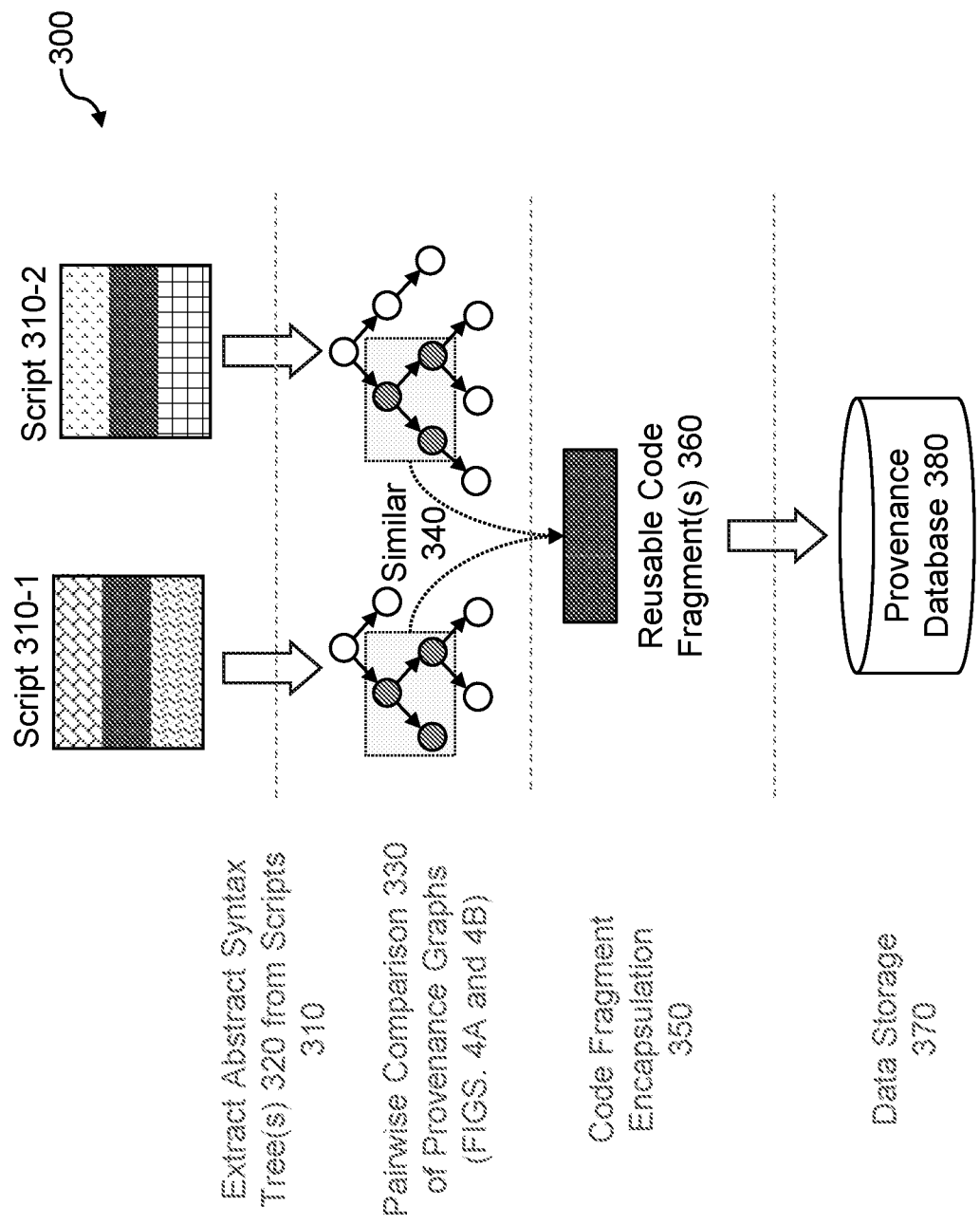
FIG. 3 is a flow chart illustrating an exemplary implementation of an encapsulation process for encapsulating similar pieces of source code as reusable code fragments, as part of the fragment reuse step of FIG. 2, according to some embodiments of the disclosure.

FIG. 3 is a flow chart illustrating an exemplary implementation of an encapsulation process 300 for encapsulating similar pieces of source code as reusable code fragments 250, as part of the fragment reuse step 240 of FIG. 2, according to some embodiments of the disclosure. Generally, the exemplary encapsulation process 300 identifies and encapsulates code fragments from the software scripts 205.

As shown in FIG. 3, pairs of software scripts 310-1 and 310-2 are processed by the encapsulation process 300 to extract Abstract Syntax Trees 320 from the software scripts 310. Thereafter, a pairwise comparison is performed during step 330 to identify similar extracted Abstract Syntax Trees 340.

To reduce the computational processing cost of calculating pairwise similarity between all possible pairs of software scripts 310, one or more embodiments of the disclosure employ pattern mining strategies to extract patterns of interest (e.g., relevant and commonly used pieces of code) from the repository without performing this huge number of comparisons, as discussed further below in conjunction with FIGS. 4A and 4B.

The identified similar extracted Abstract Syntax Trees 340 are processed by a code fragment encapsulation stage 350 to generate one or more reusable code fragments 360 that are stored in a provenance database 380, during a data storage step 370, as discussed further below in conjunction with FIG. 6.

Figure 4A:
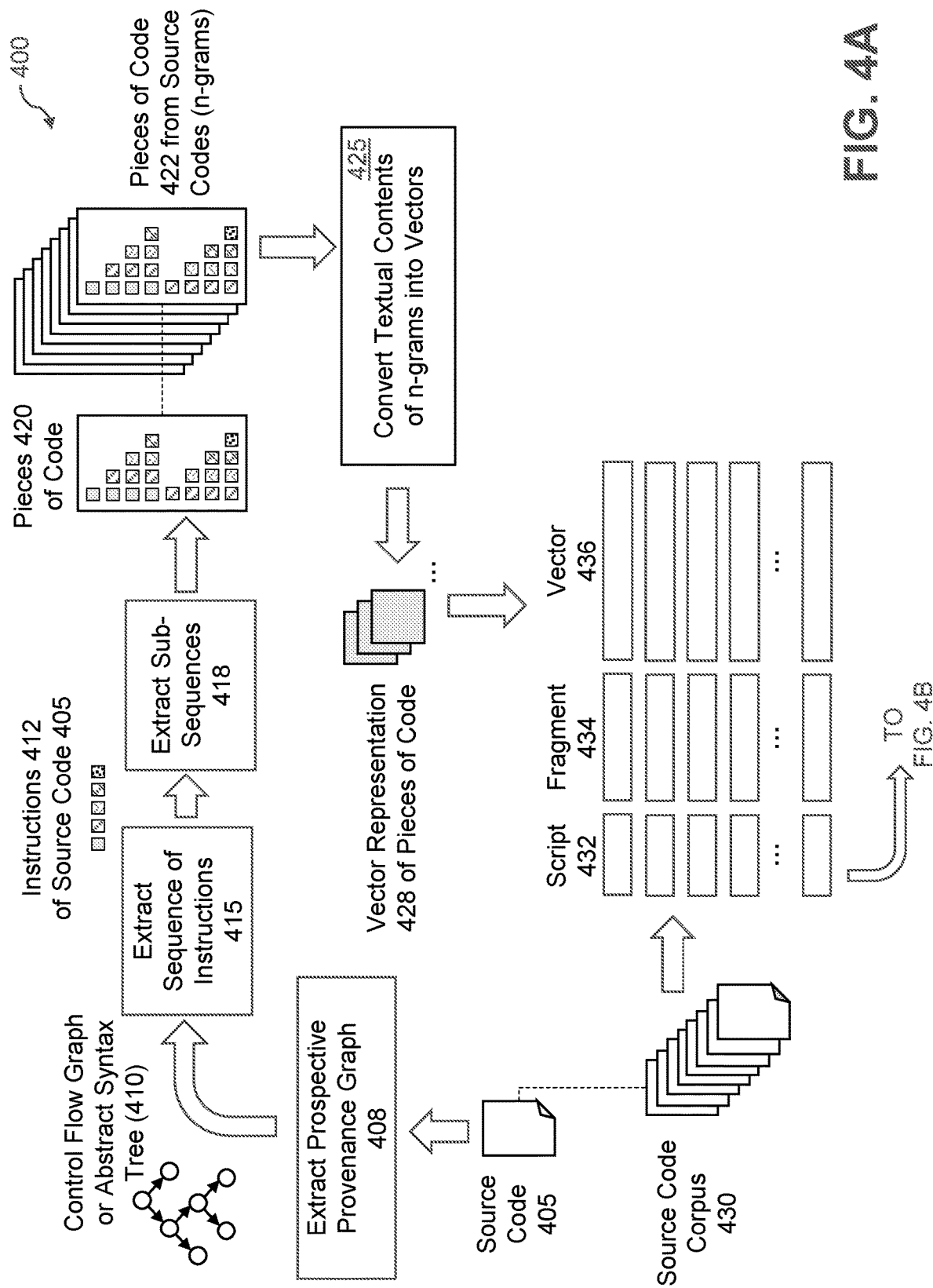
FIGS. 4A and 4B, collectively, are a flow chart illustrating an exemplary implementation of a clustering process for clustering similar pieces of code from multiple scripts, during the exemplary pairwise comparison step of FIG. 3, according to at least one embodiment of the disclosure.
Figure 4B:
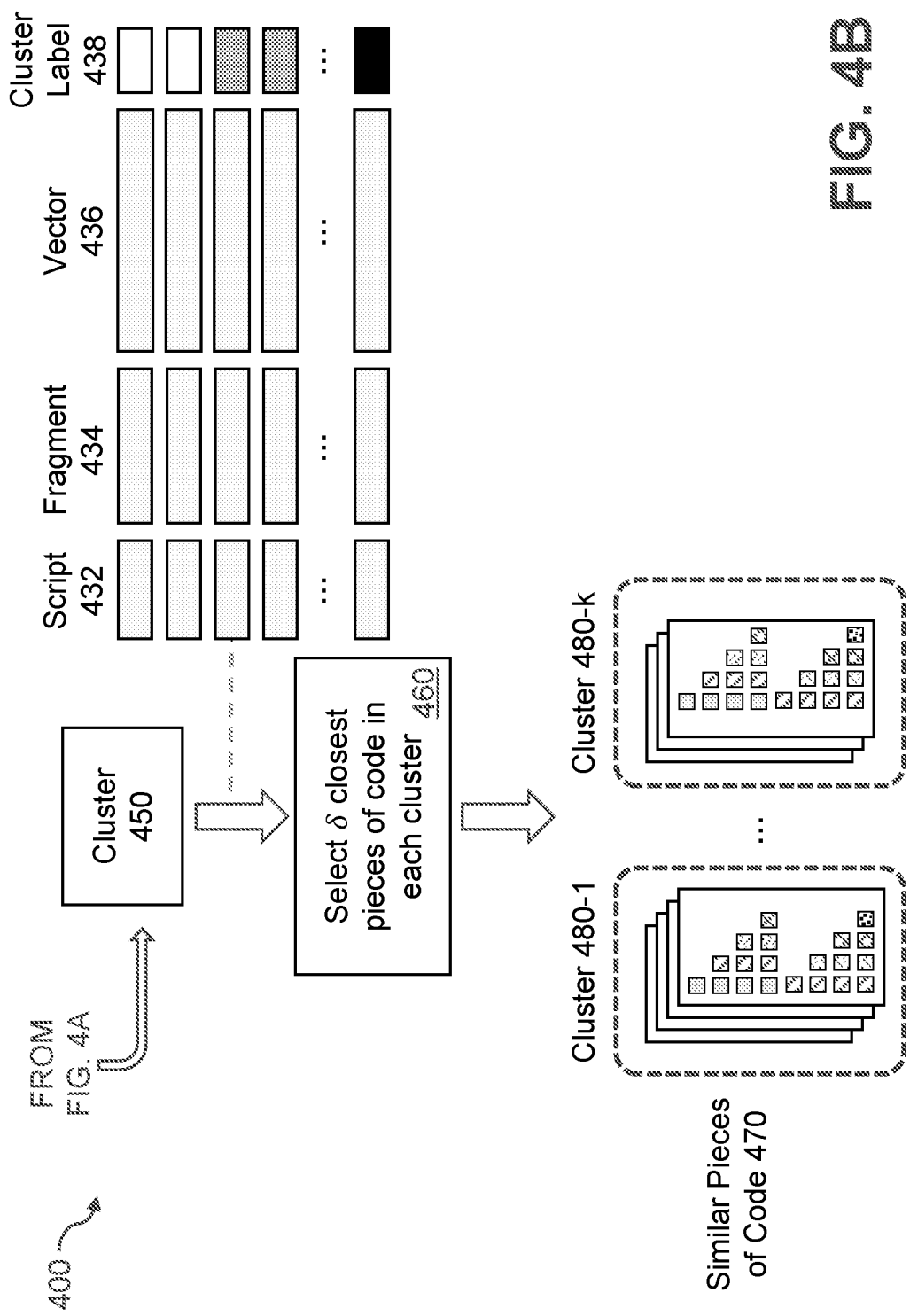

FIGS. 4A and 4B, collectively, are a flow chart illustrating an exemplary implementation of a clustering process 400 for clustering similar pieces of code from multiple scripts, during the exemplary pairwise comparison step 330 of FIG. 3, according to at least one embodiment of the disclosure. As noted above, in some embodiments, techniques are provided for reducing the computational processing cost of calculating pairwise similarity between pairs of software scripts 310.

U.S. patent application Ser. No. 16/039,743, filed Jul. 19, 2018, entitled "Allocation of Shared Computing Resources Using Source Code Feature Extraction and Clustering-Based Training of Machine Learning Models," incorporated by reference herein in its entirety, describes a suitable pattern mining strategy that can be extended as described herein, to reduce the computational processing cost of calculating the pairwise similarities.

Consider the extraction of the prospective provenance graphs 220 from software scripts 205 (FIG. 2) and the identification of continuous sequences of n lines of code (e.g., n-grams). In some embodiments of the present disclosure, an approach is provided to identify similar lines of source code based on a clustering method.

As shown in FIG. 4A, during a first step, a source code 405 is processed to extract a prospective provenance graph 408, in a similar manner as step 215 of FIG. 2. As noted above, the exemplary prospective provenance capture step 215 extracts an Abstract Syntax Tree or a Control Flow Graph from the source code 405 during step 410, since the source code 405 contains valuable information about the code structures and the sequential order of procedures to be run.

Instructions 412 of the source code 405 are processed to extract sequences of instructions 415, and then sub-sequences of instructions 418, to generate pieces of code 420. As shown in FIG. 4A, continuous sequences of n lines of code (e.g., n-grams) are assembled as pieces of code 422 from the source codes 405. During step 425, the textual contents of the pieces of code 422 of various source codes 405 are converted into a vector representation 428 (with numeric values) of the pieces of code 422 of source codes 405. Natural language processing techniques, such as one-hot encoding and Word2Vec, are optionally leveraged during step 425 to create the vector space.

In order to do so, a large corpus of text (or source code corpus 430) is analyzed to produce a vector space. In addition, evaluation metrics are applied to select the most representative pieces of code 422 on each cluster or group. In some embodiments, techniques for instruction extraction are applied from U.S. patent application Ser. No. 16/039, 743, referenced above, to identify pieces of code containing between 5 and 15 lines of code (5-grams to 15-grams). The resulting vector space after the conversion step 425 has the frequencies of the vocabulary of terms for each selected piece of source code 405.

As shown in FIG. 4A, for each software script representation 432, a corresponding reusable code fragment 434 and vector representation 436 are maintained. The processing of the software script representations 432, reusable code fragments 434 and vector representations 436 is discussed further below in conjunction with FIG. 4B.

As shown in FIG. 4B, the matrix with the vector representation 428 of all pieces of source code 405 (where each row represents a particular piece of source code), allows a clustering algorithm 450 to be applied to identify groups of similar pieces of code 470 with relation to the vector space into clusters 480-1 through 480-$k$, identified by a cluster label 438 (to supplement the software script representations 432, reusable code fragments 434 and vector representations 436). For instance, this vector space may correspond to the term frequencies and a clustering algorithm, e.g., a k-Means clustering technique, can be used for clustering pieces of code 420, where k corresponds to the number of clusters 480 or groups.

After applying the clustering algorithm 450, some pieces of code 420 within the same cluster 480 may not be exactly equal with relation to their code structures. To solve this problem, a distance between each piece of code 420 to the centroid of its corresponding cluster X could be computed and, then, the closest pieces of code 420 can be selected during step 460 as leaders of X, given a distance threshold.

In addition, these selected pieces of code 420 from a cluster can be encapsulated as reusable code fragments 360 and stored in the provenance database 380, as discussed further below in conjunction with FIG. 3. The exemplary code fragment encapsulation stage 350 follows the five dimensions of code reuse, discussed above.

Figure 5:
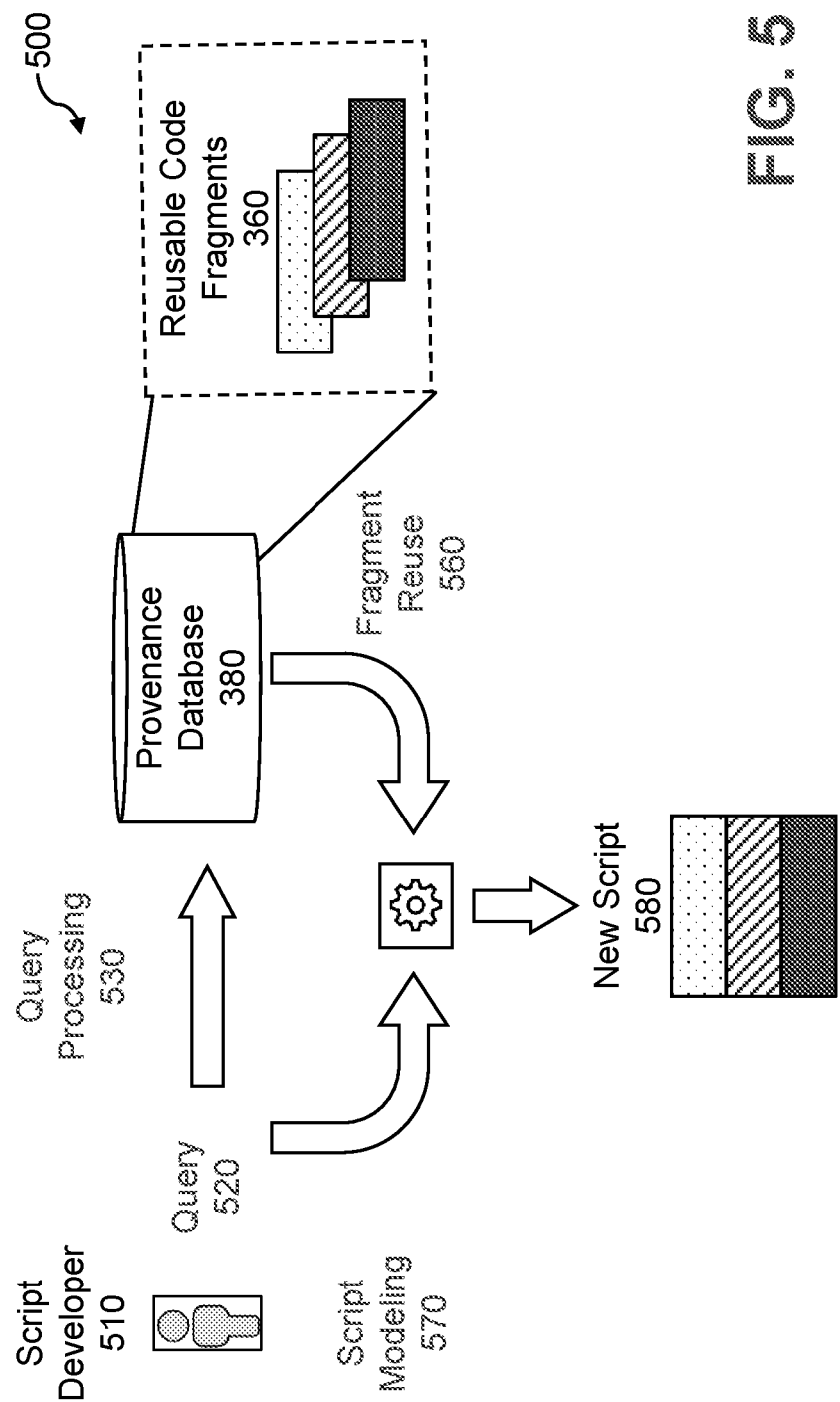
FIG. 5 is a flow chart illustrating an exemplary implementation of a source code reuse process that allows script developers to query and reuse the reusable code fragments of FIG. 3 during the development of new scripts, according to an embodiment.

FIG. 5 is a flow chart illustrating an exemplary implementation of a source code reuse process 500 that allows script developers to query and reuse the reusable code fragments 360 (FIG. 3) during the development of new scripts, according to an embodiment. As shown in FIG. 5, a script developer 510 submits a query 520 that is applied during a query processing phase 530 to the provenance database 380, comprised of the reusable code fragments 360. For example, a representative query 520 may request "reusable code fragments that generate dataset ds with parameters p1 and p2 and contain the data annotation da". The query processing phase 530 identifies one or more particular fragments 560 for reuse that satisfies the submitted query 520. The script developer 510 then performs a script modeling 570 to adapt the particular fragment 560 for reuse into a new script 580 for the new task.

FIG. 6 illustrates an exemplary implementation 600 of the exemplary searchable source code reuse database 150 of FIG. 1 in further detail, according to some embodiments. As discussed above in conjunction with FIG. 1, the exemplary provenance-based software script reuse system 100 of FIG. 1 interacts with the searchable source code reuse database 150 which stores prospective provenance graphs 220 from software scripts, the data annotations of the software scripts, the encapsulated reusable source code fragments 250, and the manipulated assets 280, 285 and 290.

In some embodiments, the source code reuse database 150 can be instantiated following the family of World Wide Web Consortium (W3C) PROV recommendations. This standard conceptual data model can combine manipulated assets and user interactions (e.g., retrospective provenance data) with provenance graphs, data annotations, identified code fragments, and developed scripts (e.g., prospective provenance data) for data analysis.

As shown in FIG. 6, the exemplary source code reuse database 150 comprises a data lake 610, the provenance database 380, as well as a provenance graphs database 640 (similar to the prospective provenance graphs 220 of FIG. 2), a metadata database 650 (similar to the metadata 230 of FIG. 2), a code fragments database 660 (similar to the source code fragments 250 of FIG. 2); and references 670 to the assets (similar to the references 670 to assets in database 298 of FIG. 2). FIG. 6 employs labels 690 indicating a "referred to" and "contains" relationship.

The exemplary data lake 610 comprises software scripts 615, new scripts 620 (similar to the software scripts 205 of FIG. 2), datasets 625, parameters 630 (similar to the parameters 285 of FIG. 2), and visualizations 635 (similar to the visualizations 290 of FIG. 2).

Figure 7:
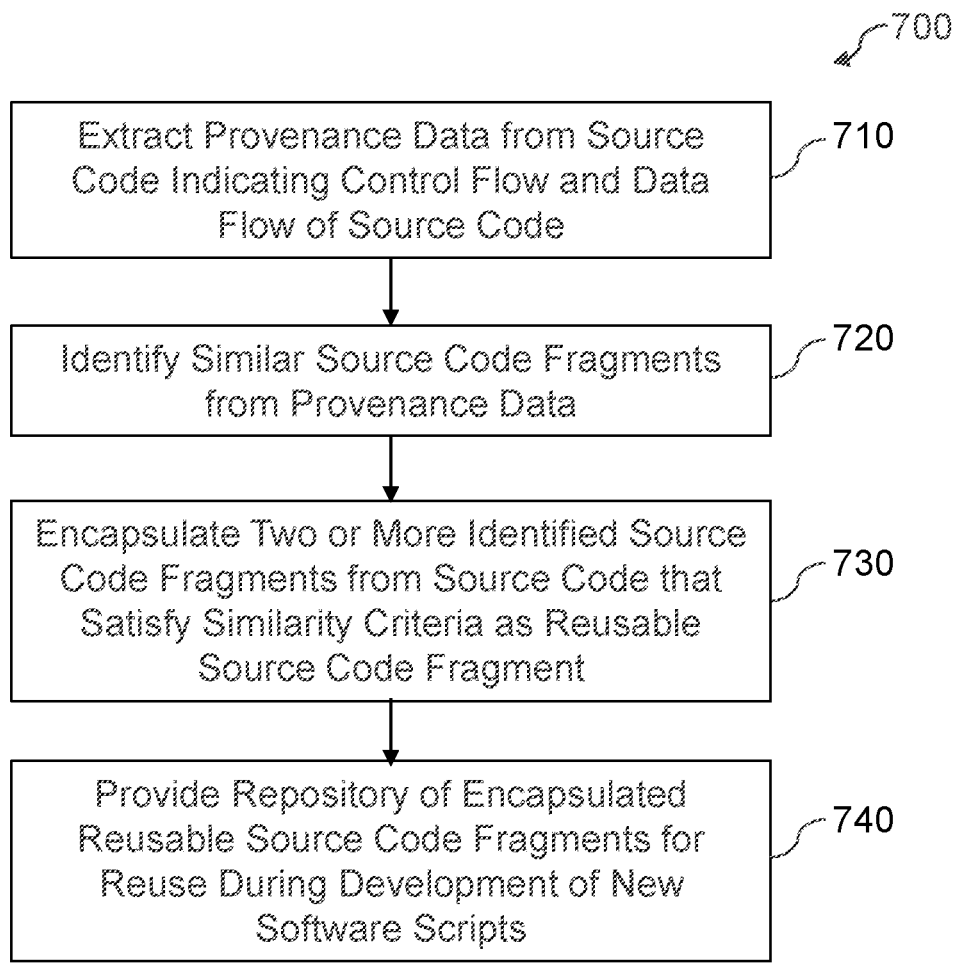
FIG. 7 is a flow chart illustrating an exemplary implementation of a provenance-based software script reuse process, according to one embodiment of the disclosure.

FIG. 7 is a flow chart illustrating an exemplary implementation of a provenance-based software script reuse process 700, according to one embodiment of the disclosure. As shown in FIG. 7, the exemplary provenance-based software script reuse process 700 initially extracts provenance data from source code during step 710, wherein the extracted provenance data indicates a control flow and a data flow of the source code.

The provenance-based software script reuse process 700 then identifies one or more similar source code fragments from the provenance data during step 720; and encapsulates two or more identified source code fragments from the source code that satisfy one or more similarity criteria as a reusable source code fragment during step 730.

Finally, a repository of a plurality of the encapsulated reusable source code fragments is provided during step 740 for reuse during a development of new software scripts.

EXAMPLE

Consider a company that decides their stock levels based on historical data. Every month, a team of data scientists go over their data lake and collect information from their data warehouse and files obtained from each of their logistic management systems. They put the information together and run several analyses to generate a report for a team of decision makers.

After a week, the decision makers request another analysis with similar requirements. However, the team of data scientists routinely does not like to spend a lot of time searching and retrieving pieces of source code from previous analysis to address the new request. When they do so, they manually copy and paste an excerpt of an old script and adapt it in the new script. This development effort is error-prone and laborious, especially when they need to reread some technical details on documents to perform their code modifications. Moreover, since the data scientists develop many scripts in their daily activities, it is hard for them to remember where the desired old script is stored. Instead of spending a substantial amount of time searching for a past script, they end up developing the same or similar lines of code again.

Furthermore, the team of data scientists noticed that some analyses made in the past depend on a set of assets manipulated by the scripts. Therefore, these analyses require searching for the history of data (or data flows) from the past executions of scripts. Since they do not have provenance support, the team of data scientists has to manually analyze each workspace to extract relevant assets. If they had access to a provenance database, they could easily track the data flow from past analysis. In addition, the company could use the provenance information to identify frequently used assets to keep them allocated in a hot data storage (e.g., cache), instead of storing in a cold data storage (e.g., hard-disks).

Different from this scenario, the present disclosure provides a provenance-aware approach that enables the management of assets manipulated by scripts, the identification of similar pieces of code that can be encapsulated as code fragments, and the reuse of a relevant fragment during the development of a new script. Moreover, data scientists and other code developers can define annotations to the reusable fragments in our approach to add more semantic data and enable the search and retrieval of relevant fragments to address requirements of a new data analysis.

Among other benefits, the disclosed techniques for provenance-based software script reuse leverage available source codes from repositories of scripts to automatically identify reusable code fragments. Thus, a clustering algorithm is applied to identify similar lines of code from multiple scripts by analyzing the vector representation (e.g., term frequencies) of each piece of code. Then, the most similar pieces of code in each cluster are selected and encapsulated as reusable fragments, as discussed above.

Existing repositories that contain data analysis code are typically characterized by a huge number and variety of developed scripts. In the present disclosure, provenance management techniques are used to track the history of the identified code fragments as well as additional data annotations, such as manual user-defined labels, code comments, creation and modification of timestamps, and user interactions. Such an enriched version of the database provides valuable information for data scientists and other code developers.

Data analyses in accordance with the present disclosure are characterized by the consumption and production of several assets, such as input datasets 280, input parameters 285, service-level agreements, partial and final results, and visualizations 290. In their traditional execution environment, these assets are spread in several workspaces. With some embodiments of the disclosed provenance-based software script reuse techniques, the references to these assets are stored in a catalog, whose provenance and domain data follow a standard data model to provide interoperability, reliability, and reproducibility of the executed scripts.

One or more embodiments of the disclosure provide improved methods, apparatus and computer program products for provenance-based software script reuse. The foregoing applications and associated embodiments should be considered as illustrative only, and numerous other embodiments can be configured using the techniques disclosed herein, in a wide variety of different applications.

It should also be understood that the disclosed source code reuse techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for provenance-based software script reuse may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based source code reuse engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based source code reuse platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. These platforms may also be used to implement at least portions of other information processing systems in other embodiments.

Figure 8:
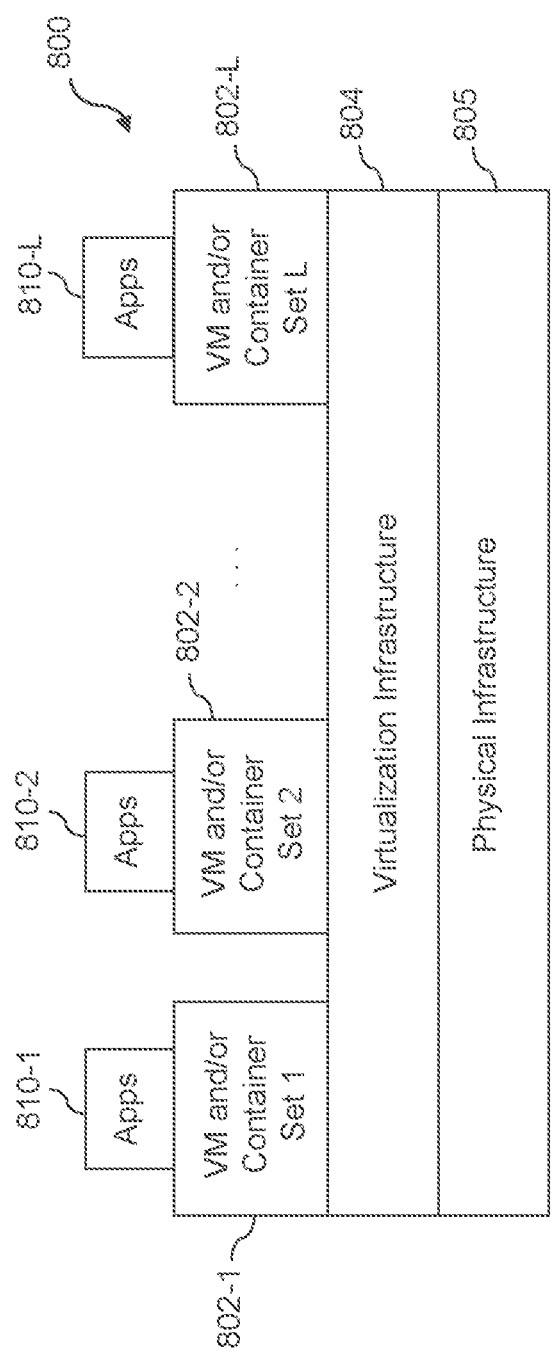
FIG. 8 illustrates an exemplary processing platform that may be used to implement at least a portion of one or more embodiments of the disclosure comprising a cloud infrastructure.

FIG. 8 shows an example processing platform comprising cloud infrastructure 800. The cloud infrastructure 800 comprises a combination of physical and virtual processing resources that may be utilized to implement at least a portion of an information processing system. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. Such implementations can provide source code reuse functionality of the type described above for one or more processes running on a given one of the VMs. For example, each of the VMs can implement source code reuse control logic and an associated source code reuse database for providing source code reuse functionality for one or more processes running on that particular VM.

An example of a hypervisor platform that may be used to implement a hypervisor within the virtualization infrastructure 804 is the VMware® vSphere® which may have an associated virtual infrastructure management system such as the VMware® vCenter™. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system. Such implementations can provide source code reuse functionality of the type described above for one or more processes running on different ones of the containers. For example, a container host device supporting multiple containers of one or more container sets can implement one or more instances of source code reuse control logic and associated source code reuse database for providing source code reuse functionality.

As is apparent from the above, one or more of the processing modules or other components of the provenance-based software script reuse system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an application specific integrated circuit (ASIC), a field programmable gate array (FPGA) or other type of processing circuitry, as well as portions or combinations of such circuitry elements, and the memory 912, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Figure 9:
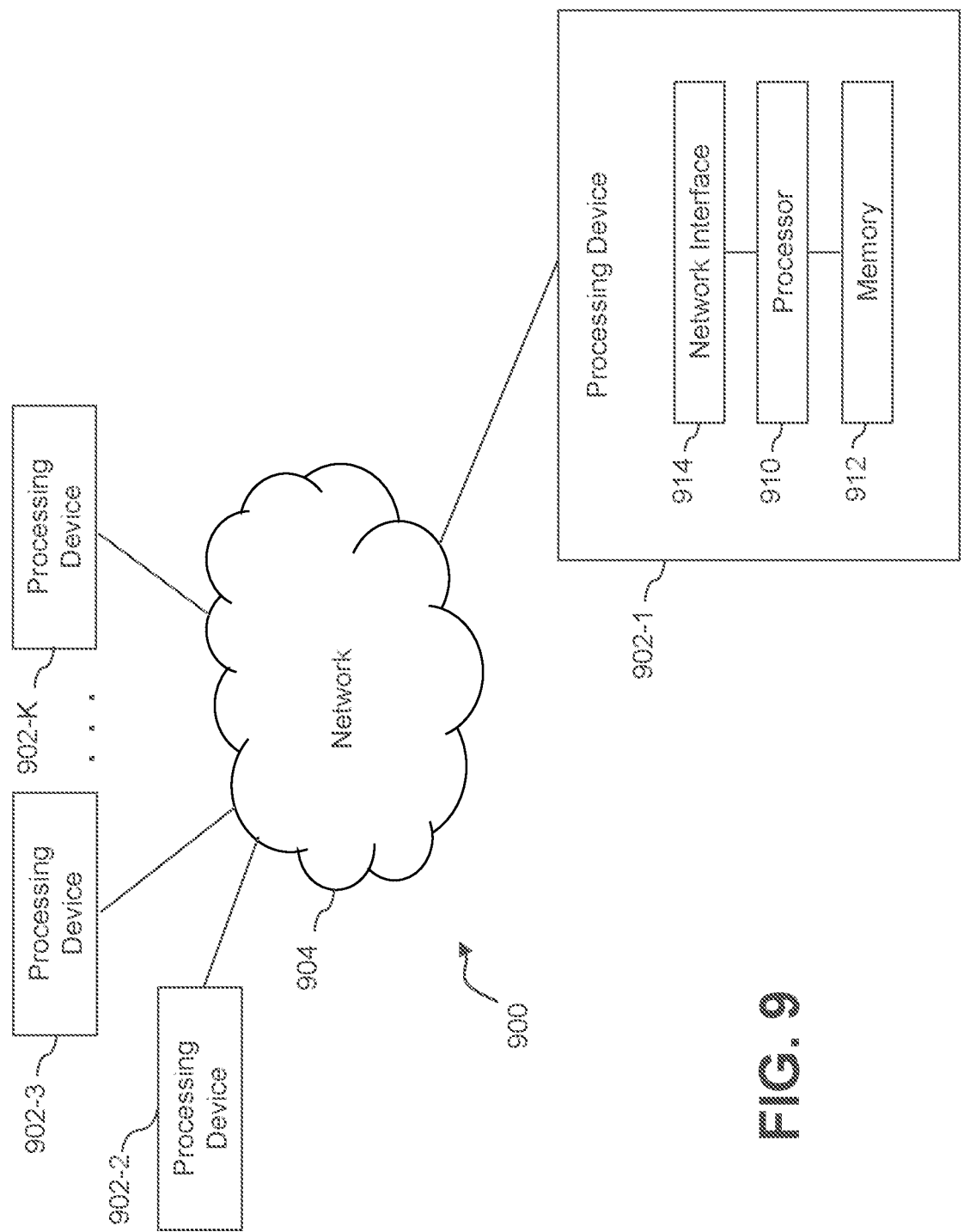
FIG. 9 illustrates another exemplary processing platform that may be used to implement at least a portion of one or more embodiments of the disclosure.

Multiple elements of an information processing system may be collectively implemented on a common processing platform of the type shown in FIG. 8 or 9, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   extracting provenance data from source code in a source code corpus, wherein the source code comprises a plurality of source code fragments, and wherein the extracted provenance data indicates a control flow of the source code and a data flow of the source code;
   encapsulating two or more source code fragments from the source code that satisfy one or more similarity criteria as a reusable source code fragment; and
   providing a repository of a plurality of the encapsulated reusable source code fragments for reuse during a development of new software scripts, wherein the repository of encapsulated reusable source code fragments further comprises a searchable database comprising the extracted provenance data indicating the control flow of the source code and the data flow of the source code, wherein the data flow of the source code indicates data generated by past executions of the source code such that at least one encapsulated reusable source code fragment is identified in the repository that: (i) generates a given dataset and (ii) has one or more given input parameters, wherein the given dataset and the one or more given input parameters are identified in a query submitted to identify one or more of the at least one encapsulated reusable source code fragment for reuse in another source code, and wherein a processing of the query comprises identifying the given dataset, identified in the query, in the indicated data generated by the past executions of the source code in the extracted provenance data;
   wherein the method is performed by at least one processing device comprising a processor coupled to a memory.

2. The method of claim 1, further comprising storing data annotations made to the source code by a software developer as metadata for the source code.

3. The method of claim 1, wherein the extracted provenance data comprises information about code structures of the source code and a sequential order of procedures executed by the source code.

4. The method of claim 1, wherein the encapsulating the two or more source code fragments from the source code that satisfy the similarity criteria as the encapsulated reusable source code fragment further comprises performing a pairwise comparison of pairs of the source code fragments to identify similar source code fragments.

5. The method of claim 1, wherein the encapsulating the two or more source code fragments from the source code that satisfy the similarity criteria as the encapsulated reusable source code fragment further comprises clustering similar lines of software code from multiple source code scripts using a distance metric relative to a centroid of a given cluster to select at least a subset of source code fragments in the given cluster and encapsulating the selected subset of source code fragments of the given cluster as the encapsulated reusable source code fragments.

6. The method of claim 1, wherein the searchable database further comprises data annotations, the input parameters and the data generated by the past executions of the source code for a corresponding source code fragment.

7. The method of claim 6, wherein at least a portion of the repository of encapsulated reusable source code fragments follows a standard data model to provide one or more of interoperability, reliability, and reproducibility of the new software scripts.

8. The method of claim 1, wherein the data flow of the source code is used to identify data to store in a faster storage class relative to at least one additional storage class.

9. A computer program product, comprising a tangible processor-readable storage medium having encoded therein executable code of one or more software programs, wherein the one or more software programs when executed by at least one processing device perform the following steps:
extracting provenance data from source code in a source code corpus, wherein the source code comprises a plurality of source code fragments, and wherein the extracted provenance data indicates a control flow of the source code and a data flow of the source code;
encapsulating two or more source code fragments from the source code that satisfy one or more similarity criteria as a reusable source code fragment; and
providing a repository of a plurality of the encapsulated reusable source code fragments for reuse during a development of new software scripts, wherein the repository of encapsulated reusable source code fragments further comprises a searchable database comprising the extracted provenance data indicating the control flow of the source code and the data flow of the source code, wherein the data flow of the source code indicates data generated by past executions of the source code such that at least one encapsulated reusable source code fragment is identified in the repository that: (i) generates a given dataset and (ii) has one or more given input parameters, wherein the given dataset and the one or more given input parameters are identified in a query submitted to identify one or more of the at least one encapsulated reusable source code fragment for reuse in another source code, and wherein a processing of the submitted query comprises identifying the given dataset, identified in the submitted query, in the indicated data generated by the past executions of the source code in the extracted provenance data.

10. The computer program product of claim 9, wherein the extracted provenance data comprises information about code structures of the source code and a sequential order of procedures executed by the source code.

11. The computer program product of claim 9, wherein the step of encapsulating the two or more source code fragments from the source code that satisfy the similarity criteria as the encapsulated reusable source code fragment further comprises a step of performing a pairwise comparison of pairs of the source code fragments to identify similar source code fragments.

12. The computer program product of claim 9, wherein the step of encapsulating the two or more source code fragments from the source code that satisfy the similarity criteria as the encapsulated reusable source code fragment further comprises a step of clustering similar lines of software code from multiple source code scripts using a distance metric relative to a centroid of a given cluster to select at least a subset of source code fragments in the given cluster and encapsulating the selected subset of source code fragments of the given cluster as the encapsulated reusable source code fragments.

13. The computer program product of claim 9, wherein the searchable database further comprises data annotations, the input parameters and the data generated by the past executions of the source code for a corresponding source code fragment.

14. The computer program product of claim 13, wherein at least a portion of the repository of encapsulated reusable source code fragments follows a standard data model to provide one or more of interoperability, reliability, and reproducibility of the new software scripts.

15. An apparatus, comprising:
a memory; and
at least one processing device, coupled to the memory, operative to implement the following steps:
extracting provenance data from source code in a source code corpus, wherein the source code comprises a plurality of source code fragments, and wherein the extracted provenance data indicates a control flow of the source code and a data flow of the source code;
encapsulating two or more source code fragments from the source code that satisfy one or more similarity criteria as a reusable source code fragment; and
providing a repository of a plurality of the encapsulated reusable source code fragments for reuse during a development of new software scripts, wherein the repository of encapsulated reusable source code fragments further comprises a searchable database comprising the extracted provenance data indicating the control flow of the source code and the data flow of the source code, wherein the data flow of the source code indicates data generated by past executions of the source code such that at least one encapsulated reusable source code fragment is identified in the repository that: (i) generates a given dataset and (ii) has one or more given input parameters, wherein the given dataset and the one or more given input parameters are identified in a query submitted to identify one or more of the at least one encapsulated reusable source code fragment for reuse in another source code, and wherein a processing of the submitted query comprises identifying the given dataset, identified in the submitted query, in the indicated data generated by the past executions of the source code in the extracted provenance data.

16. The apparatus of claim 15, further comprising a step of storing data annotations made to the source code by a software developer as metadata for the source code.

17. The apparatus of claim 15, wherein the extracted provenance data comprises information about code structures of the source code and a sequential order of procedures executed by the source code.

18. The apparatus of claim 15, wherein the step of encapsulating the two or more source code fragments from the source code that satisfy the similarity criteria as the encapsulated reusable source code fragment further comprises a step of performing a pairwise comparison of pairs of the source code fragments to identify similar source code fragments.

19. The apparatus of claim 15, wherein the step of encapsulating the two or more source code fragments from the source code that satisfy the similarity criteria as the encapsulated reusable source code fragment further comprises a step of clustering similar lines of software code from multiple source code scripts using a distance metric relative to a centroid of a given cluster to select at least a subset of source code fragments in the given cluster and encapsulating the selected subset of source code fragments of the given cluster as the encapsulated reusable source code fragments.

20. The apparatus of claim 15, wherein the searchable database further comprises data annotations, the input parameters and the data generated by the past executions of the source code for a corresponding source code fragment.

\* \* \* \* \*